United States Patent

Gee et al.

[11] Patent Number: 5,534,365
[45] Date of Patent: Jul. 9, 1996

[54] BATTERY WITH FUSIBLE SOLID ELECTROLYTE

[76] Inventors: Michael A. Gee, 5525 Blossom Gardens Cir., San Jose, Calif. 95123; Ib I. Olsen, 730 S. Saratoga Ave., #W301, San Jose, Calif. 95129

[21] Appl. No.: 255,018

[22] Filed: Jun. 7, 1994

[51] Int. Cl.$^6$ .................................................. H01M 10/40
[52] U.S. Cl. .................................................. 429/62; 429/192
[58] Field of Search .................... 429/62, 192; 252/62.2

[56] References Cited

U.S. PATENT DOCUMENTS

| | | | |
|---|---|---|---|
| 4,075,400 | 2/1978 | Fritts | 429/62 |
| 4,190,707 | 2/1980 | Doi et al. | 429/254 |
| 4,287,276 | 9/1981 | Lundquist, Jr. et al. | 429/206 |
| 4,361,632 | 11/1982 | Weber et al. | 429/145 |
| 4,650,730 | 3/1987 | Lundquist et al. | 429/62 |
| 4,731,304 | 5/1988 | Lundquist et al. | 429/62 |
| 4,849,311 | 7/1989 | Itoh et al. | 429/192 |
| 4,973,532 | 11/1990 | Taskier et al. | 429/62 |
| 5,091,272 | 2/1992 | Treger | 429/62 |
| 5,136,474 | 8/1992 | Sarangapani et al. | 252/62.2 X |
| 5,238,759 | 8/1993 | Richta et al. | 429/192 |
| 5,252,253 | 11/1993 | Golovin | 429/192 |

OTHER PUBLICATIONS

Laman, F. C. et al., "Impedance Studies for Separators in Rechargeable Lithium Batteries", J. of Electrochem. Soc., vol. 140, No. 4, Apr. 1993, pp. L51–L53.

Gee, M. A. and Laman, F. C., "Thermal Stability Study of LiAsF$_6$ Electrolytes Using Accelerating Rate Calorimetry" J. of Electrochem. Soc., vol. 140, No. 4, Apr. 1993, pp. L53–L55.

*Primary Examiner*—Stephen Kalafut

[57] ABSTRACT

A fusible solid electrolyte for use in electrochemical cells contains dispersed particles of an inert fusible material.

24 Claims, 1 Drawing Sheet

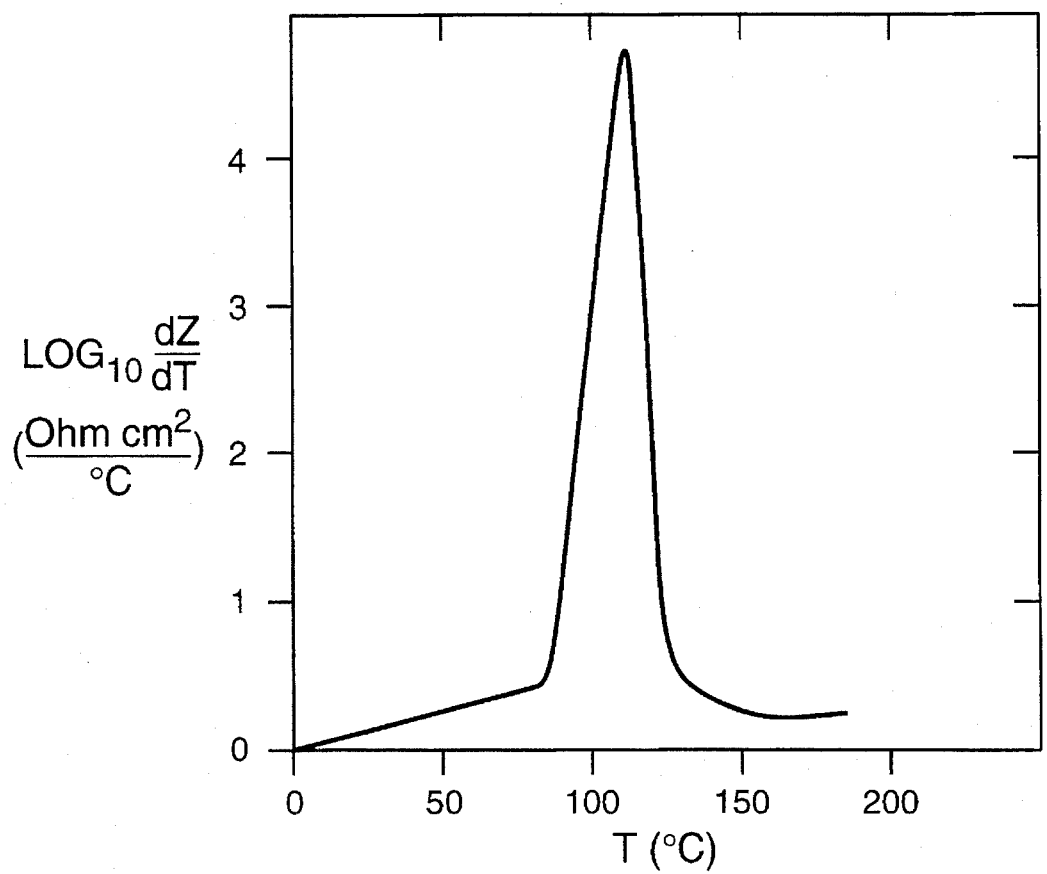
FIG._1

BATTERY WITH FUSIBLE SOLID ELECTROLYTE

FIELD OF THE INVENTION

The invention is directed to solid electrolyte batteries and, in particular, to lithium batteries with fusible solid electrolytes which prevent overheating and thermal runaway under abusive usage.

BACKGROUND OF THE INVENTION

Solid secondary electrochemical cells, and batteries containing such cells, consist of pairs of electrodes of opposite polarity separated by an electrolyte. The charge flow between electrodes is maintained by an ionically conducting solid electrolyte.

Solid secondary lithium electrochemical batteries comprise a lithium anode and have many advantages over other electrical storage devices. Lithium batteries are capable of much higher power storage densities than batteries not based on the lithium, and have excellent shelf life and cycle life. Such batteries are generally composed of a lithium anode and a composite cathode containing carbon and an intercalating compound such as the oxides or sulfides of vanadium, molybdenum, cobalt, manganese and nickel. The anode and cathode are separated by a solid electrolyte which may be inorganic or organic. Much interest has recently focused on solid polymeric electrolytes composed of a solid polymeric matrix, an inorganic ion salt and an electrolyte solvent or plasticizer. Successful use of lithium batteries depends on their safety during operations under normal conditions and even under abusive usage. An abusive use such as short circuiting or rapid overcharging of the battery may initiate self-heating of the battery, as opposed to merely resistive heating, leading to thermal runaway. The main processes causing self-heating of a secondary lithium cell involve the chemical reaction between cycled lithium and electrolyte. While it was previously believed that the temperature of onset of the first thermal interaction between lithium and electrolyte solvent is near 125° C., it is now known that the reactions are initiated at temperatures near 100° C. At temperatures greater than 100° C., contributions to cell self-heating come from exothermic decomposition of the electrolyte as well as reaction between lithium and the electrolyte salt. See, for example, U. von Sacken and J. R. Dahn, Abstract 54, p. 87, The Electrochem. Soc. Extended Abstracts, Vol. 90–2, Seattle Wash., Oct. 14–19, 1990.

To control overheating under abusive usage, it has been suggested that a thermally activated separator be developed for insertion between the cathode and the anode. It has been suggested many times that a microporous sheet might function as a battery separator if it exhibited low resistivity at normal operating temperatures but irreversibly transformed into a product having high resistivity at high temperatures, while maintaining its overall length, breadth and physical integrity (see U.S. Pat. Nos. 4,731,304; 4,973,532; 4,287,276; 4,361,632; 4,190,707; 4,075,400; and 4,650,730). But microporous polymeric films presently employed as separators in lithium batteries are generally not capable of preventing uncontrolled overheating. In general, polymeric separators disintegrate, to one extent or another, under the influence of heat and thermal reactions, or become dimensionally unstable.

It has been suggested by F. C. Laman, M. A. Gee and J. Denovan, Electrochem. Soc. Letters, 140 (1993) L51, that for a separator to function well as an internal safety device in a lithium battery, it should have the following characteristics: a melting point close to 100° C. (i.e., sufficiently below the initiation of self-heating, but well above operating temperatures that should be tolerated), a high dimensional stability temperature preferably above the melting point of lithium, and a high degree and rate of shutdown, giving rise to an impedance increase of at least three orders of magnitude within a few degrees Celsius in temperature. The authors' reference to dimensional stability, and their conclusion that all these characteristics could be obtained easily only by combining different separators, demonstrates the persistent reliance on physical barriers in battery separator technology.

It would be advantageous to the art of secondary lithium battery design if battery separators were not physical barriers, but were integral to the electrolyte, and, in fact, functioned as the electrolyte up to a specified initiation temperature, and thereafter, the electrolyte underwent an irreversible transformation to function as an ionic insulator at all temperatures greater than the initiation temperature.

SUMMARY OF THE INVENTION

The present invention is directed to a fusible solid electrolyte for solid secondary lithium electrochemical cells, and other electrochemical cells which are compatible with solid electrolytes of this nature. In particular, the fusible solid electrolyte contains dispersed particles of an inert fusible material.

In an embodiment of this invention, a solid polymeric electrolyte functions as an ionically insulating separator above an initiation temperature because the electrolyte contains dispersed particles of an inert fusible material which melts at or near the initiation temperature.

In another aspect of the present invention, an electrochemical cell contains an anode composed of compatible lithium anodic material; a cathode composed of compatible cathodic material; and interposed therebetween, a solid electrolyte containing dispersed particles of an inert fusible material. It is preferred that the solid electrolyte be organic and polymeric in nature, but it may be inorganic, such as alumina, or inorganic polymeric in nature, such as the polyphosphazenes. Preferably, the solid polymeric electrolyte contains an inorganic ion salt and an electrolyte solvent as well as a solid polymeric matrix.

Preferably, the battery is a lithium-based battery, more preferably a lithium battery or electrochemical cell with a metallic lithium anode. In which event, it is preferable that the fusible material have a melting point in the range from about 80° C. to about 120° C., more preferably from about 90° C. to about 110° C.

The fusible material is basically any inert material having an appropriate melting point to quench the cell's electrochemical activity above the initiation temperature. Of course, the fusible material is substantially nonconducting and is dispersed in the fusible solid electrolyte in a particulate size, particulate density, weight and volume percent, so as to raise the impedance of the electrolyte by several orders of magnitude when heated above the initiation temperature.

Preferably, the fusible material is a thermoplastic resin. The oligomer or polymer of which the thermoplastic resin is composed may be selected from the group consisting of polyolefin, polyvinylacetate, polyphosphate, brominated hydrocarbons and blends thereof. Of these, a fusible material containing a polyolefin, such as polyethylene, is preferred. Polyethylene is usable in any of its forms, as low density polyethylene, as high density polyethylene, as linear low density polyethylene, as EVA-PE copolymer, etc.

It is desirable that the impedance of the fusible solid electrolyte be greater than about $10^3$ ohm cm$^2$, in a lithium-based battery, above 110° C.

The physical form of the fusible material in the electrolyte must be dispersed as a particulate. Preferably, the fusible material particulate constitutes from about 5 to about 50 weight percent of the fusible solid electrolyte, more preferably from about 10 to about 20 weight percent of the fusible solid electrolyte. Volume-wise, the fusible material preferably constitutes from about 10 to about 70 volume percent of the fusible solid electrolyte, more preferably from about 10 to about 30 volume percent of the fusible solid electrolyte.

The dispersed particles of the fusible material are of from about 0.5 to about 5µ in average diameter, preferably from about 0.5 to about 2µ in average diameter.

In a particularly preferred embodiment of the invention, the fusible solid electrolyte is bilayered. The total solid electrolyte thickness is in the range of from about 10 to about 250µ, more preferably from about 20 to about 150µ, and it is composed of two layers. In this embodiment, one layer of the solid electrolyte contains dispersed particles of an inert fusible material, and is of about 10–15 µ in thickness. The other layer, not containing dispersed particles of fusible material, makes up the remainder of the solid electrolyte.

BRIEF DESCRIPTION OF THE DRAWING

FIG. 1 illustrates the idealized change in cell impedance with temperature, i.e. $\log_{10} dZ/dT$(ohm cm$^2$/° C.) vs. T(° C.) in a solid secondary lithium electrochemical cell containing a dispersed inert fusible material having a sharp melting point at 100° C., according to the invention.

DETAILED DESCRIPTION OF THE PREFERRED EMBODIMENTS OF THE INVENTION

The invention is directed to a fusible solid electrolyte containing dispersed particles of an inert fusible material. While the electrolyte solid matrix may be inorganic or organic, preferably it is an organic polymeric solid matrix. However, prior to describing this invention in further detail, the following terms will be defined.

The term "solid polymeric matrix", as used herein, refers to a polymer made by polymerizing or copolymerizing monomer(s) or prepolymer(s) or oligomer(s). Certain solid polymeric matrices are useful in the preparation of solid polymeric electrolytes, are well known in the art, and are described, for example, in U.S. Pat. Nos. 4,908,283 and 4,925,751, both of which are incorporated herein by reference in their entirety.

The term, "a solid polymeric matrix forming monomer or polymer precursor" refers to inorganic or organic materials which in monomeric, oligomeric or polymeric form can be polymerized, or further polymerized, as by cross-linking, preferably in the presence of a salt and a solvent, to form solid polymeric matrices which are suitable for use in solid polymeric electrolytes in electrochemical cells.

The term "compatible electrolyte solvent", or in the context of components of the solid electrolyte, just "solvent", is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 80° C., and more preferably greater than 85° C., to simplify manufacture and increase the shelf life of the electrolyte/battery. Typical examples of solvent are mixtures of such materials as propylene carbonate, ethylene carbonate, gamma-butyrolactone, tetrahydrofuran, glyme, diglyme, triglyme, tetraglyme, dimethyl-sulfoxide, dioxolane, sulfolane, and the like. A particularly preferred solvent is disclosed in U.S. Pat. No. 5,262,253, which is incorporated herein by reference in its entirety.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$ and the like. Specific examples of suitable inorganic ion salts include $LiClO_4$, LiI LiSCN, $LiBF_4$, $LiAsF_6$, $LiCF_3SO_3$, $LiPF_6$, NaI, NaSCN, KI, and the like. The inorganic ion salt preferably contains at least one atom selected from the group consisting of Li, Na and K.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The "anode" refers to an electrode for the half-cell reaction of oxidation on discharge, which is typically comprised of a compatible anodic material, i.e. any material which functions as an anode in a solid secondary electrochemical cell. Such compatible anodic materials are well known in the art and include, by way of example, lithium, lithium alloys, such as alloys of lithium with aluminum, mercury, iron, zinc and the like, and intercalation-based anodes such as carbon, tungsten oxide and the like.

The "cathode" refers to the counter-electrode to the anode and is typically composed of a compatible cathodic material (i.e. insertion compounds) which is any material which functions as a cathode in a secondary electrochemical cell. Such compatible cathodic materials are well known to the art and include by way of example, manganese oxides, molybdenum oxides, vanadium oxides, such as $V_6O_{13}$, sulfides of molybdenum, titanium and niobium, lithiated cobalt oxides, lithiated manganese oxides, lithiated nickel oxides, chromium oxides, copper oxides, and the like. The particular compatible cathodic material employed is not critical.

The term "an inert fusible material" refers to any inert fusible material which is capable of being liquified by heat. That is, the fusible material will flow above a certain temperature, which for our purposes, we refer to as the melting point. The fluidity of a polymer or oligomer above its melting point depends upon the molecular structure of the material, e.g. whether linear or branched. The fluidity can be measured by standard techniques such as Standard Load Melt Index Test, ASTM-1238. While any compatible material may be used as the particulate fusible material in the present invention, it must melt at or near the specified initiation temperature for the fusible solid electrolyte in which it is employed. For lithium batteries, this temperature is in the range from about 80° C. to about 120° C., preferably from about 90° C. to about 110° C. The dispersed fusible material at the initiation temperature in the fusible solid electrolyte exhibits the ability to rapidly increase the impedance of the electrolyte by several orders of magnitude. Preferably, the electrolyte's impedance, Z, will increase by about $10^3$ ohm cm$^2$ over about 5°–110° C., preferably by $10^4$ ohm cm$^2$ (see FIG. 1). The inert fusible material may be a high melting point wax, although a thermoplastic resin (or thermoplastic polymer or oligomer) is preferred.

The term "thermoplastic resin" refers to resins (i.e. plastics) which can be repeatedly softened by heating and hardened again upon cooling. Important polymers and oligomers of which such resins are composed include polyethylene, polypropylene, polyvinylchloride, and polystyrene. The inert fusible material may be a substantially uniform mixture of a thermoplastic resin and a compatible plasticizer in a weight ratio of from about 1:1 to about 100:1 (resin-:plasticizer). Such plasticizers are well known to the art.

Preferred is an inert fusible material that is made from polyethylene or polypropylene. For example, low density polyethylene is suitable, as are linear low density and high density polyethylene. Polypropylene may be used an atactic, isotactic or syndiotactic polypropylene. Therefore, in general, the preferred polyolefin fusible material may be amorphous or crystalline. While amorphous polymers may be preferred for lower melting points, in some circumstances crystalline polymers may be preferred for their sharper melting points under other circumstances. Examples of such thermoplastic resins include polyethylene (Allied Signal, Inc., grades C-9, C-6, C-5, C-18 or A-617), low density polyethylene (Plast Labor, SA COATHYLENE (TM), HA 1591, or HX 1591) or ethylene-vinyl acetate copolymer (Allied Signal, Inc., grades 400, 405 or 430; Plast Labor, SA COATHYLENE (TM)CB 3547).

The thermoplastic resins or waxes will be used in the form of finely divided particles, i.e. powders, of average particle size in the range of from about 0.5µ to 5µ, and more preferably from about 0.5µ to about 2µ. Resin powders are obtained by methods known to the art, such as grinding, re-crystallization from solution, spray-drying from solution in a volatile solvent, emulsion polymerization, suspension polymerization, fluidized bed polymerization, and so forth.

The term "separator" refers to a component of an electrochemical cell which prevents physical contact of the two electrodes of opposite polarity but allows ionic conduction.

The physical form of the fusible material in the electrolyte must be dispersed as a particulate. Preferably, the fusible material in particulate form constitutes from about 5 to about 50 weight percent of the fusible solid electrolyte, more preferably from about 10 to about 20 weight percent of the fusible solid electrolyte. Volume-wise, the fusible material preferably constitutes from about 10 to about 70 volume percent of the fusible solid electrolyte, more preferably from about 10 to about 30 volume percent of the fusible solid electrolyte.

The dispersed particles of the fusible material are of from about 0.5 to about 5µ in average diameter, preferably from about 0.5µ to about 2µ in average diameter.

In a particularly preferred embodiment of the invention, the fusible solid electrolyte is bilayered. The total solid electrolyte thickness is in the range of from about 10 to about 250µ, more preferably from about 20 to about 150µ, and it is composed of two layers. In this embodiment, one layer of the solid electrolyte contains dispersed particles of an inert fusible material, and is of about 10–15µ in thickness. The other layer, not containing dispersed particles of fusible material, makes up the remainder of the solid electrolyte.

Methodology

Solid secondary electrochemical cells containing fusible solid electrolytes of this invention are described in the following examples. Methods for preparing solid electrochemical cells and batteries are also set forth in U.S. Pat. Nos. 5,262,253, 4,830,939 and 4,925,751 and U.S. patent application Ser. No. 07/918,509 filed Jul. 22, 1992; 08/049,212, filed Apr. 19, 1993, all of which are incorporated herein by reference.

EXAMPLE 1

Polyethylene having a melting point of approximately 100° C. is prepared in the following manner. To a dry steel pressure bomb is added under a nitrogen atmosphere, 0.5 grams of an active hydrogenation catalyst prepared by the reaction of 276 grams of 25% Ni(NO$_3$)$_4$ solution containing 35 grams of kieselguhr in suspension with 1700 grams of 6% NaHCO$_3$. The precipitate of basic nickel carbonate on kieselguhr is reduced by hydrogen at 450°–475° C. The reduced catalyst is stabilized by exposure at room temperature to air. The catalyst contains 30–35% elementary nickel and the balance mainly consists of nickel oxide. To the catalyst is added 189 grams of benzene solution containing 3.72 grams of n-BuLi. The bomb is sealed and then charged with ethylene to a pressure of 990 lbs/in$^2$. The temperature rises to 48° C. upon introduction of the ethylene. The mixture is agitated for 6 hours under a pressure of 800 to 1010 lbs/in$^2$ which is maintained by occasional introduction of the ethylene to a total 126 grams added. During this reaction time the temperature drops to 35° C. and the bomb upon standing for an additional 16 hours gives a reaction temperature of 22 ° C. The pressure of the reaction mixture drops from 995 to 700 lbs/in$^2$. The excess ethylene is vented and the semi-solid product transferred to a flask containing 500 grams of 5% aqueous HCl. The volatile material is removed by steam distillation and the residue dried to afford 36 grams (28.8% ) of a light grey waxy solid, melting point 106°–110° C. The polymer is insoluble in cold solvents, but dissolves in hydrocarbon solvents upon boiling at approximately 106°–110° C. or higher. The polymer shows a crystalline pattern by x-ray diffraction analysis. For further illustration see, for example, U.S. Pat. No. 2,212,155 which is incorporated by reference.

The following example 2 illustrates a method of how an electrolytic cell could be fabricated.

EXAMPLE 2

A solid electrolytic cell is prepared by first preparing a cathodic paste which is spread onto a current collector. An electrolyte solution is then placed onto the cathode surface and the cathode paste and electrolyte solution are simultaneously cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio.

The adhesion promoter layer is prepared as a dispersed colloidal solution in one of two methods. The first preparation of this colloidal solution for this example is as follows:

84.4 parts by weight of carbon powder (Shawinigan Black™—available from Chevron Chemical Company, San Ramon, Calif.)

337.6 parts by weight of a 25 weight percent solution of polyacrylic acid (a reported average molecular weight of about 90,000, commercially available from Aldrich Chemical Company—contains about 84.4 grams polyacrylic acid and 253.2 grams water)

578.0 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil (about 9 inches wide and about 0.0005 to about 0.001 inches thick). After application, the solvent is evaporated by placing the mixture/foil into a conventional oven. After evaporation, an electrically-conducting adhesion-promoter layer of about 4–6 microns in thickness is formed. The aluminum foil is then cut to about 8 inches wide by removing approximately ½ inch from the sides with a conventional slitter so as to remove any uneven edges; the foil can then be further cut to the desired size.

The second preparation of this colloidal solution comprises mixing 25 lbs of carbon powder (Shawinigan Black™—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lighting Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 microns with the occasional 12.5 micron particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 microns cloth filter (e.g., So-Clean Filter Systems, American Felt and Filter Company, Newburgh, N.Y.) and coated as described above.

B. The Cathode

The cathode is prepared from a cathodic paste which, in turn, is prepared from a cathode powder as follows:

i. Cathode Powder

The cathode powder is prepared by combining 94.1±1.1 weight percent $V_6O_{13}$ [prepared by heating ammonium metavanadate ($NH_4^+VO_3^-$) at 450° C. for 16 hours under $N_2$ flow] and 5.9±1.1 weight percent of carbon (available from AKZO Chemicals, Inc., Chicago, Ill., under the tradename of Ketjen Black EC 600JD™). About 100 grams of the resulting mixture is placed into a grinding machine (Attritor Model S-1 available from Union Process, Akron, Ohio) and ground for 30 minutes starting at 150 rpm and adjusted to about 250 rpm approximately 10 seconds later and held at that speed for the remainder of the 30 minute duration. Afterwards, the resulting mixture is passed through a 200 mesh screen and then dried in a vacuum or in an inert gas atmosphere (e.g., argon) to produce a cathode powder with a water content of less than about 1000 ppm and preferably less than about 700 ppm.

ii. Cathode Paste

A cathode paste is prepared by combining sufficient cathode powder to provide for a final product having about 53 weight percent $V_6O_{13}$. The paste contains the following (in approximate weight percent):

| | |
|---|---|
| $V_6O_{13}$ | 53.0% |
| Carbon | 3.7% |
| 4:1 propylene carbonate/triglyme | 31.9% |
| polyethylene oxide | 2.0% |
| polyethylene glycol diacrylate | 8.0% |
| ethoxylated trimethylolpropane triacrylate | 1.4% |

The method of preparing 100 grams of the cathode paste is as follows:

31.9 grams of a solvent having a 4:1 weight ratio of propylene carbonate: triglyme is mixed with 8 grams of polyethylene glycol diacrylate (molecular weight about 400 available as SR-344 from Sartomer Company, Inc., Exton, Pa.), and 1.4 grams of ethoxylated trimethylol-propane triacrylate (TMPEOTA) (molecular weight about 450 and available as SR-454 from Sartomer Co., Inc.), in a double planetary mixer (Ross No. 2 mixer, available from Charles Ross & Sons, Co., Hauppage, N.Y.) to form a solvent solution.

53 grams of $V_6O_{13}$ 3.7 grams of carbon, and 2 grams of polyethylene oxide are mixed in a V-blender before being transferred to the double planetary mixer where the blend is stirred at 7.5 Hz and 25° C. (The polyethylene oxide preferably is vacuum dried at 350° C. for three hours prior to use.) The above solvent solution is first passed through 4A molecular sieves and then added to the $V_6O_{13}$ and carbon blend under vacuum mixing over a 5 minute period. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The resulting cathode paste is maintained at about 45° C. until applied onto the current collector. The so-prepared cathode paste can be placed onto the adhesion layer of the current collector by extrusion at a temperature of from about 45° to about 48° C. The extruded cathode paste is then spread to a substantially uniform thickness of about 50–120 microns over the current collector by a comma bar.

C. Electrolyte 56.51 grams of propylene carbonate, 14.13 grams of triglyme, and 17.56 grams of urethane acrylate (Actilane SP023, available from Akcros Chemicals, Ltd., Manchester, United Kingdom) are combined at room temperature until homogeneous. The resulting solution is optionally passed through a column of 4A molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent is dissolved. A thermocouple is placed at the edge of the vortex created by the magnetic stirrer to monitor solution temperature. The solution is cooled to a temperature of less than 48° C. and then 9.24 grams of $LiPF_6$ and 10 grams of polyethylene resin powder are added to the solution over a 120 minute period while thoroughly mixing to ensure a substantially uniform temperature profile throughout the solution. Cooling is applied as necessary to maintain the temperature of the solution between 45° and 48° C.

In one optional embodiment, the polyethylene oxide film forming agent is added to the solution via a mini-sieve such as a 25 mesh mini-sieve commercially available as Order No. 57333-965 from VWR Scientific, San Francisco, Calif. the resulting solution contains the following:

| Component | Amount (gm) | Weight Percent[a] |
| --- | --- | --- |
| Propylene Carbonate | 48.51 | 48.51 |
| Triglyme | 12.13 | 12.13 |
| Urethane Acrylate | 17.56 | 17.56 |
| $LiPF_6$ | 9.24 | 9.24 |
| PEO Film Forming Agent | 2.57 | 2.57 |
| Polyethylene Resin Powder | 10.00 | 10.00 |
| Total | 100.00 | 100.00 |

[a] = weight percent based on the total weight of the electrolyte solution (100 g)

This solution is then degassed to provide for an electrolyte solution wherein little, if any, of the $LiPF_6$ salt decomposes.

Optionally, the above solution which contains the prepolymer, the polyalkylene oxide film forming agent, the electrolytic solvent and the $LiPF_6$ salt, is filtered to remove any solid particles or gels remaining in the solution. One suitable filter device is a sintered stainless steel screen having a pore size between 1 and 50 microns at 100% efficiency.

In the alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over 4A molecular sieves (Grade 514, 8–12 Mesh from Schoofs Inc., Moraga, Calif.) and then proceed to step 4.

2. Dry the propylene carbonate and triglyme over 4A molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and pre-sifted polyethylene oxide film forming agent slowly to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent and is light yellow in color. Optionally, in this step, the mixture is heated to 65° C. to 68° C.

7. Cool the solution produced in step 6 and when the temperature of the solution reaches 40° C., add the $LiPF_6$ salt and polyethylene resin powder very slowly making sure that the maximum temperature does not exceed 55° C. and preferably does not exceed about 40° C.

8. After the final addition of the $LiPF_6$ salt and resin, stir for an additional 30 minutes, degas, and let sit overnight and cool.

9. Filter the solution through a sintered stainless steel screen having a pore size between 1 and 50 microns at 100% efficiency.

At all times, the temperature of the solution should be monitored with a thermocouple which should be placed in the vortex formed by the mixer.

Afterwards, the electrolyte mixture is then coated by a slot die coater to a thickness of about 25–50 microns onto the surface of the extruded cathode paste prepared as above. The electrolyte and cathode paste are then simultaneously cured by continuously passing the sheet through an electron beam apparatus (available as a Broad Beam electron beam processor from RPC Industries, Hayward, Calif.) at a voltage of about 250 kV and a current of about 48 mA and at a conveyor speed of 50 ft/minute. After curing, a composite is recovered which contains a solid electrolyte laminated to a solid cathode which is affixed to a current collector.

D. Anode

The anode comprises a sheet of lithium foil (about 50 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte of the above described electrolyte/cathode composite. Lamination is accomplished by minimal pressure.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A fusible solid polymeric electrolyte comprising a solid polymeric matrix, an inorganic ion salt, a compatible electrolyte solvent, and dispersed particles of an inner fusible material.

2. A fusible solid polymeric electrolyte according to claim 1 wherein said inert fusible material has a melting point in a range of from about 80° C. to about 120° C.

3. A fusible solid polymeric electrolyte according to claim 2 wherein said inert fusible material has a melting point in a range of from about 90° C. to about 110° C.

4. A fusible solid polymeric electrolyte according to claim 2 wherein said inert fusible material is a thermoplastic resin.

5. A fusible solid polymeric electrolyte according to claim 4 wherein said thermoplastic resin is composed of a polymer or oligomer selected from the group consisting of polyolefin, polyvinyl acetate, polyphosphates, brominated hydrocarbons and blends thereof.

6. A fusible solid polymeric electrolyte according to claim 5, wherein said polymer or oligomer is a polyolefin.

7. A fusible solid polymeric electrolyte according to claim 6, wherein said polyolefin is polyethylene.

8. A fusible solid polymeric electrolyte according to claim 7, wherein said polyethylene is selected from the group consisting of low density polyethylene, high density polyethylene, ethylene-vinylacetatecopolymer, linear low density polyethylene and mixtures thereof.

9. A fusible solid polymeric electrolyte according to claim 1, wherein the impedance of said fusible solid polymeric electrolyte is greater than about $10^3$ ohm $cm^2$ above about 110° C.

10. A fusible solid polymeric electrolyte according to claim 1, wherein said dispersed particles of inert fusible material constitute from about 5 to about 50 weight percent of said fusible solid electrolyte.

11. A fusible solid polymeric electrolyte according to claim 1, wherein said dispersed particles of inert fusible material constitute from about 10 to about 70 volume percent of said fusible solid electrolyte.

12. A fusible solid polymeric electrolyte according to claim 1, wherein said fusible solid polymeric electrolyte comprises two layers and said dispersed particles of inert fusible material are concentrated in one layer of said two layers, said layer being of from about 10 to about 15μ in thickness.

13. A fusible solid polymeric electrolyte according to claim 1, wherein said particles are of mean diameter in the range of from about 0.5 to 5μ.

14. A secondary electrochemical cell comprising:

an anode composed of a compatible anodic material;

a cathode composed of a compatible cathodic material; and interposed therebetween a fusible solid polymeric electrolyte comprising dispersed particles of an inert fusible material.

15. A secondary electrochemical cell according to claim 14 wherein said fusible solid polymeric electrolyte also comprises a solid polymeric matrix, an inorganic ion salt, and a compatible electrolyte solvent.

16. A secondary electrochemical cell according to claim 14, wherein the fusible solid polymeric electrolyte comprises an organic polymeric matrix and a compatible electrolyte solvent, with inorganic salt solvated in said compatible electrolyte solvent.

17. A fusible solid polymeric electrolyte according to claim 14 wherein said inert fusible material has a melting point in a range of from about 80° C. to about 120° C.

18. A fusible solid polymeric electrolyte according to claim 17 wherein said inert fusible material is a thermoplastic resin.

19. A fusible solid polymeric electrolyte according to claim 18 wherein said thermoplastic resin is composed of a polymer or oligomer selected from the group consisting of polyolefin, polyvinyl acetate, polyphosphates, brominated hydrocarbons and blends thereof.

20. A fusible solid polymeric electrolyte according to claim 14 wherein the impedance of said fusible solid polymeric electrolyte is greater than about $10^3$ ohm $cm^2$ above about 110° C.

21. A fusible solid polymeric electrolyte according to claim 14 wherein said fusible solid polymeric electrolyte comprises two layers and said dispersed particles of inert fusible material are concentrated in one layer of said two layers, said layer being of from about 10 to about 15μ in thickness.

22. A secondary electrochemical cell according to claim 14 wherein said anode is an intercalation-based anode comprising carbon.

23. A secondary electrochemical cell according to claim 14 wherein the compatible cathodic material is selected from lithiated cobalt oxides, lithiated manganese oxides, and lithiated nickel oxides.

24. A secondary electrochemical cell according to claim 22 wherein the compatible cathodic material is selected from lithiated cobalt oxides, lithiated manganese oxides, and lithiated nickel oxides.

* * * * *